United States Patent [19]

Williams

[11] 4,363,263
[45] Dec. 14, 1982

[54] EFFICIENT HIGH HUMIDITY FOOD PROCESSING SYSTEM WITH SANITIZING IMPROVEMENTS

[75] Inventor: Charles E. Williams, Moorefield, W. Va.

[73] Assignee: Hester Industries, Inc., Moorefield, W. Va.

[21] Appl. No.: 60,988

[22] Filed: Jul. 26, 1979

[51] Int. Cl.³ .............................................. A47J 37/00
[52] U.S. Cl. ........................................ 99/352; 99/325; 99/443 C; 99/466; 134/108; 198/778
[58] Field of Search ................. 99/352, 410, 417, 419, 99/443 C, 466, 325; 198/778; 134/107, 108

[56] References Cited

U.S. PATENT DOCUMENTS

| | | | |
|---|---|---|---|
| 2,951,490 | 9/1960 | Cuillier | 134/108 X |
| 3,125,017 | 11/1960 | Tauber et al. | 99/443 C |
| 3,125,946 | 3/1964 | Falla | 99/417 X |
| 3,276,352 | 10/1966 | Allen et al. | 99/352 |
| 3,348,659 | 10/1967 | Roinestad | 198/778 |
| 3,469,586 | 9/1969 | Berson et al. | 134/107 X |
| 3,489,074 | 1/1970 | Farkas et al. | 99/360 |
| 3,528,826 | 9/1970 | Wilson | 99/362 X |
| 3,695,170 | 10/1972 | Ehrenberg | 99/433 C X |
| 3,718,082 | 2/1973 | Lipoma | 99/362 X |
| 3,818,818 | 6/1974 | Hice, Sr. | 99/331 X |
| 3,866,432 | 2/1975 | Harrison | 198/778 X |
| 3,961,568 | 6/1976 | Jeppson | 99/443 C X |
| 4,081,564 | 3/1978 | Borsuk | 99/443 C X |
| 4,121,509 | 10/1978 | Baker et al. | 99/401 X |

Primary Examiner—Philip R. Coe
Assistant Examiner—Frankie L. Stinson
Attorney, Agent, or Firm—Laurence R. Brown

[57] ABSTRACT

Food products such as produce, fish, meat, and poultry are rapidly cooked and chilled in separate units through which a continuously running conveyor belt passes in a spiral pathway to converse cabinet space and produce energy efficient operation. Water is used as the heating and chilling medium in 100% humidity steam and cold humid air atmospheres respectively preferably at a pressure above atmospheric. This keeps all equipment surfaces moist and not readily contaminated by dried, accumulated, burnt on drippings, fat, proteins or other food residues. Thus, the sanitization process is simplified.

The system operates with the conveyor belt continuously running in both food processing and mechanical sanitizing modes. The latter mode includes continuous cleaning of the belt and a periodic sanitation cycle with the food processing system shut down. The sanitization is achieved by jet spray scrubbing with warm water and detergent solution and circulation through the system. Spiral belt paths of both chiller and cooker units are scanned by a rotary jet spray within the spiral. Sanitization of the entire system simultaneously prevents any re-contamination of one section by residue from another and saves time, cleaning liquids and energy.

11 Claims, 6 Drawing Figures

FIG. 2

| CLEANING MODE CONTROLS |
| --- |
| BELT DRIVE – ON |
| STEAM GENERATOR – OFF |
| HEATER – OFF |
| CLEANER PUMPS – ON |
| REFRIGERATOR – OFF |
| WATER SPRAY PUMP – ON |
| FAN – ON |
| ROTARY SPRAYS – ON |
| CLEANING PUMPS – ON |
| PRE-CLEAN MODE |
| DRAIN HEATER |
| DRAIN CHILLER |
| FOOD PROCESSING MODE |
| BELT DRIVE – ON |
| CLEANING PUMPS – ON |
| STEAM GENERATOR – ON |
| HEATER – ON |
| REFRIGERATOR – ON |
| CHILLER PUMP – ON |
| FAN – ON |
| CLEANING CYCLES – OFF |
| CLEANING SUB-CYCLES |
| PUMP WATER PRE-RINSE |
| PUMP DETERGENT WASH |
| PUMP WATER RINSE |
| STORE HALF RINSE WATER |

EFFICIENT HIGH HUMIDITY FOOD PROCESSING SYSTEM WITH SANITIZING IMPROVEMENTS

TECHNICAL FIELD

This invention relates to industrial food processing systems for cooking and chilling food products carried on continuously running conveyor belts and more particularly it relates to such systems which include sanitizing means operable to clean said units and belts.

BACKGROUND ART

Industrial cookers and chillers are known in the art which pass food products therethrough on a continuously running conveyor belt. Also sanitizing equipment and features are commonly used whenever food is processed. Cooking techniques which help preserve product characteristics are also known.

Examples of typical prior art techniques are as follows:

Conveyor type freezing and broiling apparatus in stainless steel cabinets with access doors permitting internal manual cleaning has been marketed by Certified Manufacturing, Inc. of Lynwood, Calif. 90262.

Spiral type conveyor paths in a freezing unit circulating cold dry air about a product and having associated belt sanitation equipment is disclosed in U.S. Pat. No. 3,412,476—S. Astrom—Nov. 26, 1968.

Certain techniques resolving deficiencies in cooking and cooling food products are known in batch type food processing equipment where batches are placed in an oven or freezer as long as necessary for processing. Thus, U.S. Pat. No. 3,597,228—M. R. Jeppson—Aug. 3, 1971 introduces steam into a microwave oven to reduce loss of water from the product and cooks in a hot oil bath to brown the product.

Similarly, U.S. Pat. No. 2,846,318—E. J. Kelley et al.—Aug. 5, 1958 introduces humidity in a low pressure freezing gas atmosphere to reduce dehumidification.

However, many unresolved problems remain in the prior art food processing systems, particularly where large volumes of food are rapidly processed on a continuously running conveyor passing through cooking and chilling units.

One order of problems relates to energy efficiency. In many cooking systems hot gases escape, radiation losses are large, particularly where large heated surface areas exist. In both cooking and heating systems there is generally an inefficiency in heat interface surfaces between the heating medium and the food product, requiring a significant expenditure of energy without achieving the end result intended. Particularly there is a lack of acceptable solutions available to the energy losses generally caused by the entrance and exit of conveyor belt from the cooking and chilling units.

Another order of problems relates to food appearance, taste and texture. It is difficult to avoid losses of moisture and food essences in the drying atmosphere of heating ovens and chillers, which both by nature tend to dehydrate a product. Thus, a meat, fish or poultry product in particular will tend to change shape and appearance as well as to lose flavor and moisture in both cooking and cooling processes. Complete uniform cooking throughout without unwanted change to the food texture has been difficult to attain particularly when rapid processing is required in industrial type food processors.

Yet another set of problems comes with the requirement to process food in a sanitary and sanitizable environment. In most systems a disproportionate time span and inefficiency of energy is spent in tearing down a production line for sanitization. Cooking in particular tends to burn on, dry out and accumulate drippings, proteins and other food contamination resulting in unsightly and unsanitary equipment. Also complex equipment has surfaces and interfaces difficult to reach and in warm or protected places where bacteria can breed.

Accordingly, it is an object of this invention to provide improved food processing equipment resolving the foregoing deficiencies of the prior art.

BRIEF DISCLOSURE OF THE INVENTION

This invention improves the state of the prior art by both cooking and chilling food products such as fish, meat, poultry and produce in an atmosphere approaching 100% humidity by use of water carried in gaseous form about the product as it is carried on a continuously moving conveyor belt. The water is in the form of steam for cooking and cold moist air for chilling to a product temperature approaching 0° C. Because of this moist environment contaminating residue does not tend to dry, harden or burn onto equipment surfaces thereby making feasible simple mechanical sanitizaion techniques. Also loss of moisture juices and essences from the product is prevented resulting in better flavor. In particular the heat interchange between the water processing medium and the food product is efficient and reduces processing energy.

The hot cooked food product is immediately introduced on a common conveyor belt into a chilling unit to prevent any chance to come into contact with contamination or to be in a warm environment long enough to breed bacteria, as is the case in batch processing requiring transfer of the product from a cooker to a chiller.

Sanitary features include a continuously sanitized moving conveyor belt and an automatically cycling detergent bath system for periodic cleaning of the entire food processing equipment at one time.

Thus, the system is operated in two modes, namely a food processing mode and a sanitation mode with the conveyor belt running continuously in both modes. There is no carry over contamination from one unit to the other as in the manual or sequential cleaning of a food processing system.

To obtain proper product dwell time in relatively small processing unit cabinets for cooking and chilling the conveyor belt is in a spiral path giving other operational advantages such as efficient energy transfer in both cooking and chilling. This permits small insulated cooking and chilling cabinets with far less energy loss from radiation and attrition. The spiral path is cleaned in the sanitizing mode by rotary jet spray nozzles rotated within the spirals as the belt moves.

Other features, advantages and objects of the invention will be found throughout the following text and the accompanying drawings.

BRIEF DESCRIPTION OF THE DRAWINGS

FIG. 2 is an operational mode chart showing the sanitation and food processing mode control cycles operations in the system of FIG. 1.

DETAILED DESCRIPTION OF THE PREFERRED EMBODIMENT

Figure 1:
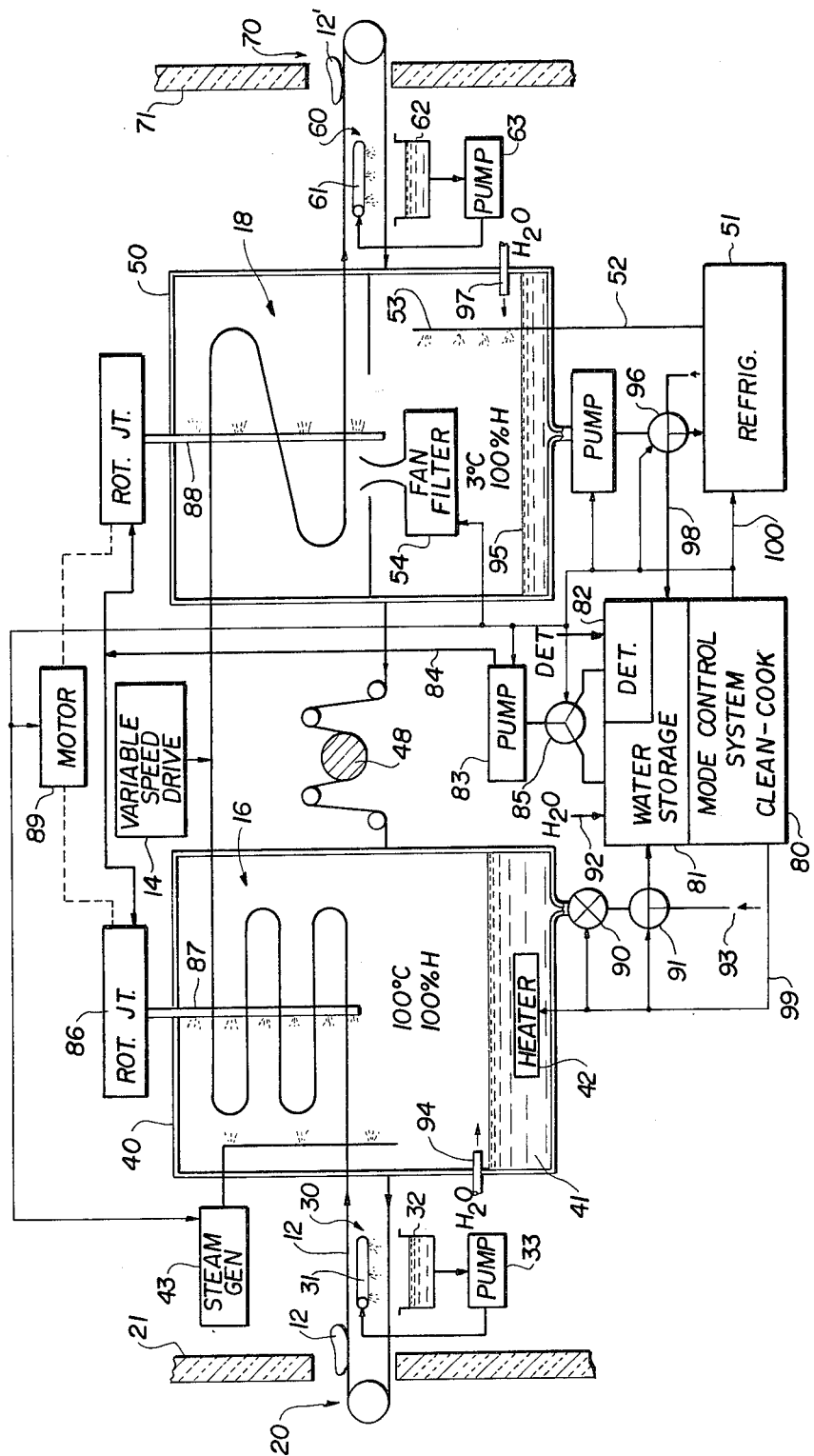
FIG. 1 is a schematic system diagram of the cooker-chiller-sanitization system afforded by this invention.

As may be seen in the system view of FIG. 1, a continuously running conveyor belt 12 feeds raw food products 12 loaded on the belt at an input station 20 through the cooker 40 and the chiller 50 to the output station 70 at which the cooked food products 12' are unloaded. The belt passes the products at a belt speed controlled by variable speed drive means 14 so that the dwell time in cooker 40 on belt spiral 16 permits thorough cooking throughout to a temperature approaching 100° C. if desired and similarly a chill dwell time on spiral belt path 18 through the chiller 50 permits the hot cooked product to be chilled immediately without chance for contamination or bacteria growth to a temperature approaching 0° C., if desired.

The atmosphere in both cooker and chiller is kept near 100% humidity thereby to assure efficient thermal exchange contact between respectively hot water in the form of steam and cold water carried by cold humid air about the products on the spiral belts. This prevents any dehumidification of the product as well and keeps all equipment humid so that any drippings or food residues do not burn, dry out or accumulate, thereby facilitating sanitation.

The heater 40, which is more fully described in my co-pending U.S. patent application U.S. Ser. No. 060,986, filed the same day as this application, has two sources of steam, namely an internal pool of water 41 heated by a heater 42 and an external steam generator 43. The products are spiraled upwardly so that if they are fatty, such as with spare ribs, fewer drippings will drop on the cooked food products as they spiral upwardly to leave the cooker unit 40. The simple cooker unit has insulated walls and plain interior stainless steel surfaces for ready sanitization and little tendency to form accumulated deposits of cooking residues.

The chiller 50 which is more fully described in my co-pending U.S. patent application U.S. Ser. No. 060,987, filed the same day as this application, has refrigerated water from refrigerator 51 passed by pipe 52 into atomizer sprays 53 so that the fan 54 can direct cold moist air upwardly through the spiral 18 in an efficient heat exchange where cooler products on the lower part of the spiral 18 encounter the cooler air exiting the fan 54 thus permitting efficient heat exchange at the upper part of the spiral 18 where the hot cooked products enter. The pump 55 recirculates the cold water through refrigerator 51 to replace the energy lost in cooling the products.

By using spiral conveyor paths and the water as a heat exchange medium in the cooker 40 and chiller 50, small cabinets are used for a large throughput of food products. This significantly reduces energy losses in heating up or cooling down a larger cabinet structure with attendant radiation and condensation losses over greater surface areas, and thus provides improved operating economy.

In the belt return path (outside the chiller and cooker) at least two sanitizing spray bath stations 60 and 30 are positioned for respectively washing the belt with a detergent spray and rinsing with water. The belt, which is preferably a stainless steel grating type belt is scrubbed by the spray nozzles 61, 31 with a jet scrubbing action on and through the moving belt. The liquid is received in basins 62, 32 and circulated by pumps 63, 33 continuously whenever the belt moves. The water and detergent solution is warm in the order of 70° C. and is pumped at a pressure in the order of at least 100 psi (690 kPa).

Because of the high humidity in the cooker and chiller units 40, 50, residue does not collect on the belt and dry on or bake on and thus any residue from the food processing or any introduction of bacteria at unloading station 70 is easily removed by this continuous belt cleaning and sanitizing process.

Figure 4:
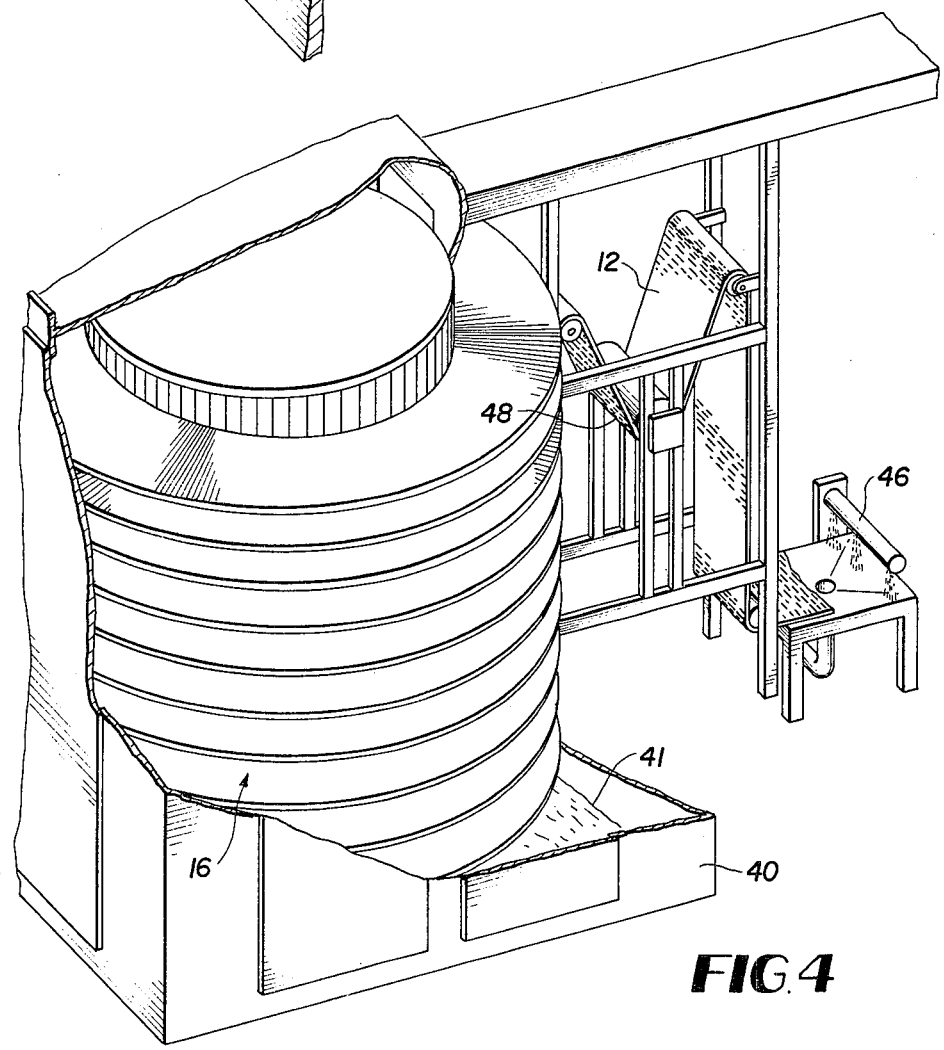
Figure 5:
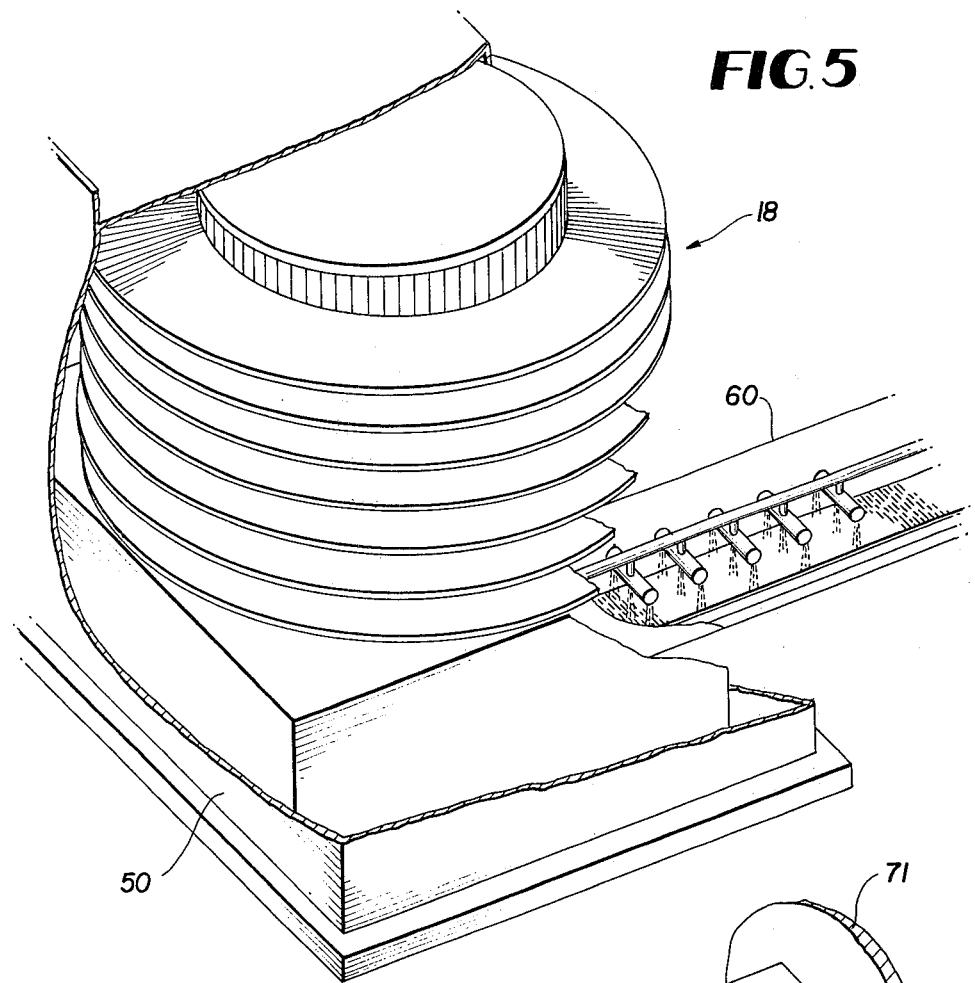

Belt tensioning means 48 is located in the return path, and as is shown in FIG. 4, a further spray jet cleaner 46 station may also be located at an intermediate belt return path position for detergent wash if a water pre-rinse is preferred at cleaning station 60.

The foregoing description of the food processing mode of operation with the periodic portion of the cleaning cycles inactive is summarized in the control flow chart of FIG. 2 in the Food Processing Mode Section, where the various units are placed in off or on condition by appropriate valves, switches, servo units, etc.

Periodically the system is shut down for the mechanical mode cleaning and sanitizing operation. This cleaning and sanitizing mode is also set forth in summary control flow chart form in FIG. 2 together with two auxiliary cycles namely the pre-clean mode and the cleaning sub-cycles.

Thus mode control means 80 contains for example a set of switches, valves or servo controls manually or automatically selectable to place the required items into on-off position. For the auxiliary cycles namely the pre-cleaning mode and the cleaning sub-cycles, timers may be used to control the sequencing, or manual controls may select each condition in a sequence manually timed. It is to be recognized the cleaning mode may be made completely automatic, if desired by use of an appropriate control system.

Water, such as from supply tank 81, is used for rinse cycles and detergent may be drawn from supply tank 82. The fluid water and detergent solution are heated to supply the water at about 66° C. and the detergent at about 70° C. Then pump 83 through piping 84 supplies the stored water or detergent as selected by valve 85 through two rotary joints 86 to the vicinity of the respective cooker belt spiral 16 and chiller belt spiral by way of spray nozzle rods 87, 88 respectively positioned along the spiral axis. These rotate with a jet scrubbing action by means of motor 89 to scan all sectors of the spiral in sequence with a high pressure jet spray. The belt is moving so that the jets effectively scrub the entire belt surfaces and the cleaning of the interior surfaces of both cooking and chilling units is done simultaneously to prevent carrying residue or contamination from one to the other as might happen if sequentially cleaned.

The heater water pool 41 is drained by way of valves 90, 91 and warm water if clean and sanitary and without fat or residue in heater pool 41 may be stored in tank 81 for the cleaning cycle. Otherwise pure water is inserted by inlet 92 and heated before use in the cleaning cycle.

With the valve 90 open and T-valve 91 discharging water as indicated by the flow schematic notation 93, the cleansing bath from rotating spray nozzle pipe 87 can clean the entire inner surfaces of the cooker 40 and be discharged in an appropriate sewer line, or the like. Pure water may be introduced into cooker 40 at 94 and heated for a further cooking cycle.

Similarly in cooler 50, residue water 95 being circulated through refrigerator 51 is dischargeable by T-valve 96, for the pre-clean mode only. For both clean and cook modes the water is pumped through refrigerator 51 and spray nozzles 53. New pure water may be entered at 97 for a new cook-chill mode of operation after cleaning and discharge of cleaning fluids. Also T-valve 96 may send some of the rinse water back into storage tank 81 after any initial portion of the rinse water containing residues is discharged, thereby to save water and thus also energy. For sanitary purposes, any water salvage is initiated only after the initial detergent sediment and residue is drained off. Similarly T-valve 91 will permit rinse water to be saved from cooker 40. The dual line pipe notation such as at link 97 is shown for water-detergent flow paths and control mode linkages are shown by the single line notation of control lines 99, 100.

It is seen, by reference to the conditions of FIG. 2, that each of the valves, pumps, motors and heat exchange units can be controlled for on-off operation or disconnected by means of controls designated along the lines 99, 100. Thus, heater 42 may be turned on or off and valves 90, 91 operated along control line 99. An auxiliary pump (not shown) of course could be used to pump out the heater water pool 41 and also is controlled by this line 99.

Similarly line 100 can turn the refrigeration of unit 51 on or off, operate T-valve 96 to any of three discharge paths, turn on or off pump 55 for circulating water through the refrigeration-atomizer cooker circuit, choose water 81 or detergent 82 by operation of T-valve 85, operate cleaning pump 83, control belt drive at 14 if desired, rotate sprays 87, 88 by means of motor 89, turn on or off the steam supply from generator 43, and operate fan 54.

Thus when in the cleaning mode detergent solution or water rinse spray from nozzles 88 in cooler 50 is accumulated in pool 95 and circulated through the refrigerator and nozzles 53. Thus atomized moisture is carried through fan filter 54 to effectively clean the entire chiller 50 and also its auxiliary refrigeration system.

Preferably the cleaning is done cyclically in three steps, namely pre-rinse with water, wash with detergent, and rinse with water sub-cycles, where about the last half of the rinse water is stored in tank 81 for reuse. The necessary operations are shown in the cleaning sub-cycles mode portion of FIG. 2. Manual sequencing or automatically timed steppers can be used for control of these cycles while the processor is in the main cleaning mode condition. The sequencing controls utilize pump 83, T-valve 85 and storage T-valves 91, 96 for selection of the detergent solution and water and storage of rinse water.

Preferably during the food processing mode, cooking and chilling operations, the cooker 40 and chiller 50 are maintained at a pressure above atmospheric to reduce cooking and cooling time and improve energy efficiency. One means for supplementing the pressure is to install the cooker and cooler 40, 50 within a pressurized room signified by walls 21, 71. This leads also to a receptiveness of the food product loaded under atmospheric pressure at station 20 to penetration of heat in cooker 40 and further retards losses of moisture and food essences from the product.

Various system features contribute in unison and cooperatively to save energy, including such features as recirculation of belt wash water, the direction of belt travel and the spiral pathway through the heat exchange units, the use of water as a heat exchange medium in a near 100% humidity atmosphere, the saving of cleaning fluid, the short cleaning cycle and reduced system down time, the small cabinet structure with attendant reduced losses, the short conveyor belt paths, etc. Other such features are also to be recognized from consideration of FIGS. 3 to 6.

Figure 3:
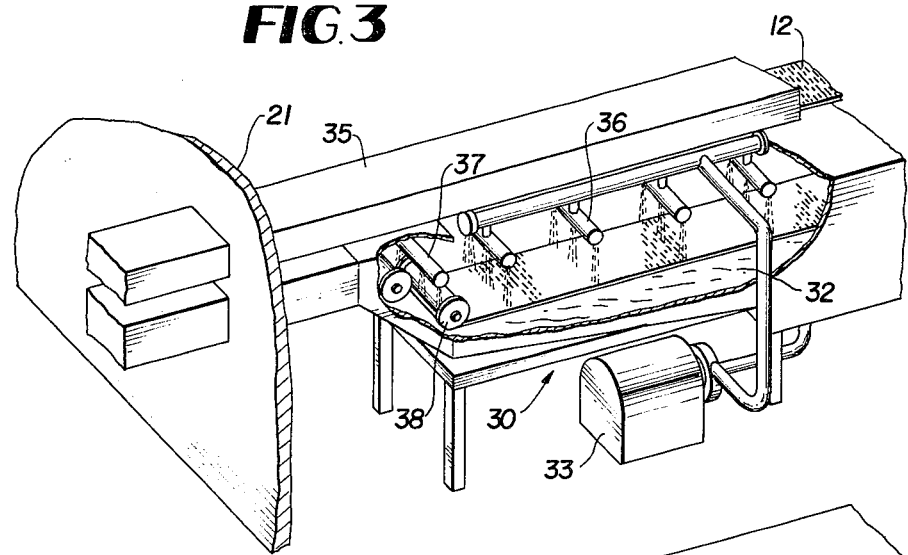
FIGS. 3 to 6 are diagrammatic views of the various parts of the system of FIG. 1 shown in respective sequential order from input of a raw product to output of a cooked and chilled product through the cooker unit of FIG. 4 and the chiller unit of FIG. 5.

Thus in FIG. 3, the belt 12 is retained in protective ducts 35 in which control means such as baffles and fans are introduced for preventing entry or exit of air carried by the belt from one unit to another. Such a trap unit is shown at 65 in FIG. 6, where the ducts 35 go through the unloading station wall 71. Thus, a fan at 73 may prevent entry of cool outside air, which can dissipate the solution spray heat at cleaning station 60, carried by belt 12 by creating a counter flow of air opposite the belt travel and baffles may be placed in duct portion 74 for reducing and retarding inward flow of air. Similar traps may be placed in the duct system at entranceways and exitways into the cooker 40 and cooler 50 to reduce heat losses from flow of atmosphere with the belt.

Figure 6:
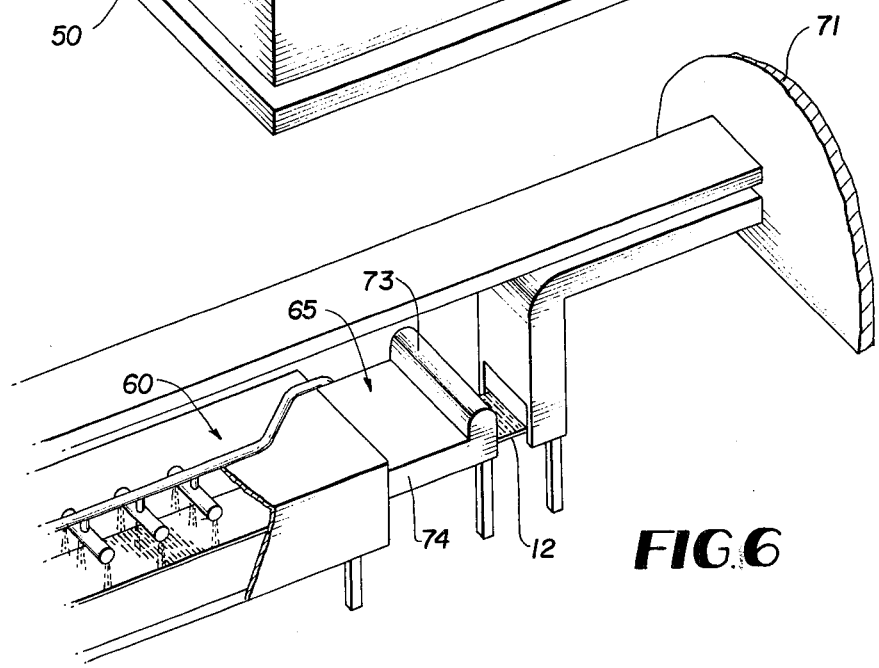

Note that a water pre-rinse may be effected at spray cleaning station 60 in FIG. 6, a detergent bath at intermediate spray cleaning station 46 in FIG. 4, and a final rinse at the typical cleaning station 30 in FIG. 3, all in the conveyor belt return path between unloading station 70 and the loading station 30, thereby assuring a sanitized belt for loading the products at station 20 under sanitary belt conditions.

In the spray station 30 the sump basin 32 is arranged in the ductway about belt 12 to permit the spray nozzle arms 36 to pass the cleaning jets of warm water at a pressure produced by pump 33 in the order of 100 psi (690k Pa). Thus warm water passes through and scrubs the gridwork of the moving belt for effective rinsing. The squeeze or cleaning brush 37 cleans liquid from roller 38 to prevent carrying of excess moisture along the belt path into the loading station.

It has been found that products 12 preferably of common size and shape positioned across a wide conveyor belt can pass through the system in about 20 minutes and achieve a consistent cooking temperature throughout greater than 90° C. in the cooker and a similar consistent temperature approaching 0° C. in the chiller, typically 5° C.

It is therefore evident that various novel features including a mechanically operated sanitizing system and efficient cooking and chilling means are provided by this invention. Those novel features believed descriptive of the spirit and nature of the invention are defined with particularity in the claims.

INDUSTRIAL APPLICATION

An industrial food processing system rapidly cooks and chills food products carried between a loading station and unloading station by a continuously moving conveyor belt. The system operates in both food processing and automatic sanitization modes. It processes food through both heating and chilling cycles with high energy efficiency and without dehumidification in a sanitary environment.

What is claimed is:

1. A food processing system for heating and chilling unpackaged food products such as fish, meat, poultry and produce passing in sequence on a common conveyor belt through heating and chilling stations, comprising in combination, a continuously running single conveyor belt passing commonly through food loading, cooking, chilling and unloading stations, a heating chamber having a heating spiral conveyor belt path therethrough for carrying said unpackaged food products loaded at said loading station, a chilling chamber separately disposed from said heating chamber having a cooling spiral conveyor belt path therethrough for carrying said unpackaged food products on said belt heated in said heating chamber to present chilled food products at said unloading station, steam heat means for heating said products on said heating spiral with water carried solely in gaseous form in a steam bath at a temperature approaching 100° C. and a humidity approaching 100% without loss of moisture and food essences in said unpackaged food products and, a mechanically operable sanitizing system for said heating and chilling chambers including means for pumping and spraying detergent solutions inside the chambers over the spiral pathway of the conveyor belt therethrough wherein the mechanically operable sanitizing system includes rotatable spray nozzle means extending within the spiral belt paths respectively inside the heating and chilling chambers to rotate and scan the spray about the insides of the chambers, and means operating both the rotatable spray means in a cleaning mode simultaneously.

2. A system as defined in claim 1 including means operating the mechanical sanitizing system while the conveyor belt is continuously running.

3. A food processing system for heating and chilling unpackaged food products such as fish, meat, poultry and produce passing in sequence on a common conveyor belt through heating and chilling stations, comprising in combination, a continuously running single conveyor belt passing commonly through food loading, cooking, chilling and unloading stations, a heating chamber having a heating spiral conveyor belt path therethrough for carrying said unpackaged food products loaded at said loading station, a chilling chamber separately disposed from said heating chamber having a cooling spiral conveyor belt path therethrough for carrying said unpackaged food products on said belt heated in said heating chamber to present chilled food products at said unloading station, steam heat means for heating said products on said heating spiral with water carried solely in gaseous form in a steam bath at a temperature approaching 100° C. and a humidity approaching 100% without loss of moisture and food essences in said unpackaged food products and, a mechanically operable sanitizing system for said heating and chilling chambers including means for pumping and spraying detergent solutions inside the chambers over the spiral pathway of the conveyor belt therethrough wherein the chilling chamber has chilling means circulating cold water through spray atomizer means and a fan circulating cold humid air from the spray region to contact food products on said spiral conveyor belt path, and the mechanical sanitizing system is operated together with the chilling chamber means for circulating water and air, thereby to pass sanitizing solution through the chilling means for the chilling chamber.

4. A food processing system as defined in claim 1 including means operable with said heating unit establishing a water pool therein for steaming products passing through the heating unit on said belt, means removing said water from the heating unit, and means thereafter processing detergent from said spray over the entire inner surface of the heating unit.

5. A food processing system as defined in claim 1 including cooling means with a pump operable with said chilling unit for circulating refrigerated water through atomizing sprays and circulating air by fan means through the atomizing sprays, including means removing water from said cooling means and passing detergent therethrough when detergent is pumped through the rotating spray means in said chiller unit to thereby clean the entire interior surfaces of the chiller unit and those in the cooling means.

6. A system as defined in claim 1 wherein said sanitation means includes control means for sequencing a water rinse cycle, a detergent wash cycle and a water rinse cycle through said rotating spray.

7. A system as defined in claim 1 wherein said sanitation means includes means creating a spray jet discharging solution at a pressure in the order of 150 psi (1033.5k Pa).

8. A system as defined in claim 1 wherein said detergent cleaning solution is heated to a temperature in the order of 70° C.

9. A system as defined in claim 1 including sanitizing means continuously cleaning the running conveyor belt with a detergent spray solution at a pressure in the order of at least 100 psi (690k Pa) flowing from spray nozzles against said belt.

10. A system as defined in claim 1 wherein the food processing unit is a heater in a housing, and spiral conveyor path passes upwardly therethrough to reduce drippings downwardly through said spiral path as fatty products are heated.

11. A system as defined in claim 1 wherein the food processing unit is a chiller in a housing, a spiral conveyor path goes downwardly through said housing and a fan passes cooling air upwardly through said spiral path to thereby effectuate an efficient cooling at all product temperature gradients along the spiral path.

* * * * *